(12) United States Patent
Herzberg

(10) Patent No.: US 8,005,132 B2
(45) Date of Patent: Aug. 23, 2011

(54) NON-INTRUSIVE MODEM PERFORMANCE ANALYSIS

(75) Inventor: Hanan Herzberg, Raanana (IL)

(73) Assignee: TraceSpan Communications Ltd., RaAnana (IL)

( * ) Notice: Subject to any disclaimer, the term of this patent is extended or adjusted under 35 U.S.C. 154(b) by 0 days.

(21) Appl. No.: 10/511,859

(22) PCT Filed: Feb. 4, 2003

(86) PCT No.: PCT/IL03/00088
§ 371 (c)(1),
(2), (4) Date: Oct. 18, 2004

(87) PCT Pub. No.: WO2004/071004
PCT Pub. Date: Aug. 19, 2004

(65) Prior Publication Data
US 2005/0144272 A1    Jun. 30, 2005

(51) Int. Cl.
*H04B 17/00*    (2006.01)

(52) U.S. Cl. ........ 375/224; 375/219; 375/220; 375/222; 375/227; 379/1.01; 379/7; 379/22.02; 379/22.03; 379/22.08; 379/27.01; 379/27.03; 379/32.01; 379/35; 370/241; 370/272; 370/273; 370/276; 370/297; 455/39; 455/73; 714/39; 709/224; 725/111

(58) Field of Classification Search .................. 375/222, 375/224, 219, 220, 227; 725/111; 379/35, 379/1.01, 7, 22.02, 22.03, 22.08, 27.01, 27.03, 379/32.01; 370/241, 272, 273, 276, 297; 340/825; 709/224; 714/39; 455/39, 73
See application file for complete search history.

(56) References Cited

U.S. PATENT DOCUMENTS

| | | | | |
|---|---|---|---|---|
| 4,965,856 A * | 10/1990 | Swanic | ........................... | 398/40 |
| 5,768,312 A * | 6/1998 | Imamura | ...................... | 375/228 |
| 5,991,881 A * | 11/1999 | Conklin et al. | ................. | 726/22 |
| 6,445,733 B1 * | 9/2002 | Zuranski et al. | .............. | 375/231 |
| 6,523,233 B1 * | 2/2003 | Wang et al. | .................... | 375/224 |
| 6,690,720 B1 * | 2/2004 | Downey | ........................ | 375/222 |
| 6,718,384 B2 * | 4/2004 | Linzy | ........................... | 709/224 |
| 6,775,240 B1 * | 8/2004 | Zhang et al. | .................. | 370/251 |
| 7,100,091 B2 | 8/2006 | Nakamoto et al. | | |
| 7,213,264 B2 * | 5/2007 | Poletto et | ........................ | 726/22 |
| 2001/0013809 A1 * | 8/2001 | Fujiwara et al. | ............. | 330/149 |
| 2003/0174765 A1 * | 9/2003 | Van Den Brink et al. | ..... | 375/224 |
| 2004/0047407 A1 * | 3/2004 | Fisher et al. | .................. | 375/222 |

FOREIGN PATENT DOCUMENTS

| | | | |
|---|---|---|---|
| JP | 09139768 A | * | 5/1997 |
| WO | WO 01/52439 | | 7/2001 |
| WO | WO 02/05473 | | 1/2002 |
| WO | WO 2004/071004 | | 8/2004 |

OTHER PUBLICATIONS

Lee et al. "Passive Testing and Applications to Network Management", Network Protocols, International Conference, Atlanta, GA, IEEE, P.113-122, 1997.
Communication Pursuant to Article 96(2) EPC Dated Apr. 18, 2006 From the European Patent Office Re.: Application No. 03704980.6.
International Search Report Dated Oct. 13, 2003 From the International Searching Authority Re.: Application No. PCT/IL03/00088.
Pre-Appeal Brief Request for Review Dated Oct. 8, 2009 to the US Patent and Trademark Office Re.: U.S. Appl. No. 10/511,859.

* cited by examiner

*Primary Examiner* — Leon Flores

(57) ABSTRACT

A method of analyzing the performance of a modem connection. The method includes connecting a line interface to a communication link carrying signals of a modem connection, between a pair of end modems, collecting signals passing on the communication link, between the end modems, through the line interface, determining quality or transmission characteristics regarding the modem connection, responsive to signals collected through the line interface, and displaying information on the determined characteristics.

22 Claims, 9 Drawing Sheets

NON-INTRUSIVE MODEM PERFORMANCE ANALYSIS

RELATED APPLICATIONS

The present application is a U.S. national application of PCT Application No. PCT/IL2003/000088, filed on Feb. 4, 2003.

FIELD OF THE INVENTION

The present invention relates to communication systems and in particular to modem communication systems.

BACKGROUND OF THE INVENTION

Digital networks are used to transfer computer data and other signals between computers and other end apparatus. In connecting home users to digital networks, analog lines are commonly used. In transmitting data over analog lines, modems on opposite sides of the analog lines modulate the transmitted signals on one side and demodulate the transmitted signals on the other side.

In order to allow the end modems to communicate, protocols define the precise signals to be transmitted by the modems. These protocols include, among others, voice band modem (VBM) protocols which use the frequency band allocated to voice signals and DSL protocols (e.g., ADSL) which use-much larger portions of the frequency band of the analog line.

Some of the defined protocols are very complex, so as to achieve maximal utilization of the available bandwidth. Due to the complexity of the modem protocols, there are cases in which different vendors implement the protocols differently, leading in some cases to problems in communications.

Modem emulators are sometimes used to test the operation of modems. A modem emulator is connected on an opposite side of a communication line to which the tested modem is connected, transmits testing signal to the tested modem and provides a report on the operation of the tested modem. Another existing tool for testing modems is a pair of scope modems which are connected in the middle of a tested analog line connecting opposite end modems. Each modem in the pair of scope modems connects to a different one of the opposite end modems, forming a double connection. The pair of scope modems mirror data between the connections and provide the transferred data to an upper layer for analysis.

For security reasons it may be desired to listen to communication lines of suspected individuals. When the communication lines carry modem signals, the signals are generally demodulated in order to determine their content. The demodulation is a relatively hard task, especially if the demodulation is performed by a passive unit, which cannot request retransmissions and cannot adjust the transmission levels according to the noise level in the vicinity of the eavesdropping apparatus. Therefore, when possible, eavesdropping is performed on signals which are not modulated (e.g., already demodulated). Most VBM connections are established with an Internet Service provider (ISP) and eavesdropping can be performed by the ISP. Modem connections, however, can be established between two private modems. In such connections, it is not always known, for a monitored modem, where the other end modem is and it is not always possible to access that modem.

The signals of ADSL connections, on the other hand, are always demodulated by a modem at a local line-card of a telephone service company, and when necessary can be monitored at the line-card.

SUMMARY OF THE INVENTION

An aspect of some embodiments of the present invention relates to a performance analyzer for modem connections, optionally full-duplex modem connections, which analyzes the operation of a modem connection between a pair of modems. The performance analyzer does not replace the modems of the connection, but rather listens to the communications on the modem connection. In some embodiments of the invention, the modem performance analyzer passively listens to the signals transmitted between a pair of modems without sending acknowledgment signals or any other modem tangible signals to either of the modems. Optionally, the performance analyzer may inject noise on the communication line of the connection, at specific times, in order to cause a retrain of the connection. The performance of a retrain may aid in better understanding the signals passing on the connection and/or in identifying connection parameters.

The performance analyzer optionally provides information on at least one parameter of the physical operation of the connection, such as the power spectrum density (PSD), discrete multi-tone (DMT) mapping, noise parameters of the line and line quality. Alternatively or additionally, the performance analyzer provides information on non-data signals passing on the connection, such as negotiation signal content, and/or signaling signals passing in parallel to the data transferred on the line, for example AOC (ADSL overhead control) signals, embedded operating channel (EOC) signals and/or indicator bits (IB).

In some embodiments of the invention, the performance analyzer provides information on the modem connection in different operation layers and shows cross-references between the different layers. Optionally, the performance analyzer provides information on possible connections between data retransmissions or connection retrains and noise effects or other modem acts which caused the retransmissions or retrains.

An aspect of some embodiments of the invention relates to third-party apparatus adapted to force a retrain on an xDSL connection of a twisted pair line, without obstructing telephone service on the twisted pair line. Optionally, the apparatus does not participate in the xDSL connection. In some embodiments of the invention, the apparatus comprises a performance analyzer and/or an eavesdropper which passively listens to the xDSL connection. Forcing a retrain is optionally used to determine parameters of the xDSL connection, required for proper interpretation of the signals passing on the connection.

An aspect of some embodiments of the invention relates to an ADSL eavesdropping system which passively listens to signals passing on the connection.

There is therefore provided in accordance with an exemplary embodiment of the invention, a method of analyzing the performance of a modem connection, comprising connecting a line interface to a communication link carrying signals of a modem connection, between a pair of end modems, collecting signals passing on the communication link, between the end modems, through the line interface, determining quality or transmission characteristics regarding the modem connection, responsive to signals collected through the line interface, and displaying information on the determined characteristics.

Optionally, the modem connection comprises a full-duplex modem connection. Optionally, the modem connection comprises an ADSL modem connection. Optionally, connecting the line interface to the communication line comprises connecting at a point at least two times closer to one of the modems than the other modem. Optionally, connecting the line interface to the communication line comprises connecting at a point at most two times closer to one of the modems than to the other modem. Optionally, collecting signals passing on the communication link comprises collecting without sending to either of the modems acknowledgment signals or any other modem tangible signals. Optionally, displaying information on the determined characteristics comprises displaying the contents of one or more modem negotiation signals.

Optionally, displaying information on the determined characteristics comprises providing information on noise levels on the connection. Optionally, providing information on noise levels on the connection comprises suggesting possible sources of the noise. Optionally, displaying information on the determined characteristics comprises providing information on effects in upper layers caused by the noise levels on the connection.

Optionally, displaying information on the determined characteristics comprises providing information on the symbol mapping used by the connection. Optionally, displaying information on the determined characteristics comprises displaying information on signaling signals transmitted in parallel to data transmission. Optionally, the method includes performing signal tests on test signals transmitted on the connection and comparing the results of the tests to negotiation signals reporting test results from one of the modems. Optionally, the method includes injecting by the performance analyzer noise which forces a retrain of the modem connection.

Optionally, injecting the noise comprises injecting noise in a manner which does not substantially interfere with a different connection passing on the communication link. Optionally, injecting the noise comprises connecting a low impedance circuit, for at least some of the frequency bands carrying signals, to the communication link. Optionally, the modem connection comprises a DSL connection. Optionally, the injected noise does not interfere with voice frequency bands of the communication link. Optionally, the modem connection comprises a voice band modem connection. Optionally, the method includes identifying changes in the operation of the modem connection and providing suggested causes of the changes.

Optionally, identifying changes comprises identifying a retrain and/or a bit swap. Optionally, providing suggested causes of the changes comprises identifying, for at least one change, a noise that caused the change. Optionally, the method includes identifying data retransmissions and providing suggested causes of the data retransmissions. Optionally, displaying information on the determined characteristics comprises displaying a raw bit content of signals transmitted on the modem connection. Optionally, displaying information on the determined characteristics comprises providing a warning on a possible tapping of the communication link. Optionally, the method includes extracting the data transmitted on the modem connection.

There is further provided in accordance with an exemplary embodiment of the invention, a modem connection performance analyzer, comprising a line interface adapted to collect signals of a modem connection passing on a communication link, between two end modems connected to the link, a processor adapted to determine one or more quality or transmission characteristics regarding the modem connection, responsive to the collected signals, and a human interface adapted to provide information on the determined characteristics. Optionally, the performance analyzer includes a low impedance shorting circuit adapted to short at least some of the frequencies of the communication link, responsive to a command from the processor.

There is further provided in accordance with an exemplary embodiment of the invention, a method of monitoring an xDSL modem connection, comprising connecting a line interface to a communication link carrying signals of an xDSL modem connection, between a pair of end modems separate from the line interface, collecting signals passing between the end modems on the communication link, through the line interface, and providing information on the modem connection, responsive to the collected signals.

Optionally, providing information on the modem connection comprises providing information on the operation of the connection and/or providing data passing on the connection.

There is further provided in accordance with an exemplary embodiment of the invention, a method of forcing a retrain on a modem connection, comprising determining at least one first frequency band to be disrupted, and connecting to a communication line carrying the modem connection, between two end modems, a circuit which disrupts transmission of signals on the at least one first frequency band. Optionally, determining the at least one first frequency band to be disrupted comprises determining a frequency band including a pilot tone frequency band of the modem connection. Optionally, the circuit disrupts the first frequency band substantially without interfering with signals of a second frequency band. Optionally, the second frequency band comprises a frequency band of voice signals. Optionally, connecting the disruption circuit comprises connecting a circuit which shorts the at least one first frequency band without shorting the second frequency band. Optionally, connecting the disruption circuit comprises connecting a circuit which injects noise at the at least one first frequency band.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EXEMPLARY EMBODIMENTS

Figure 1:
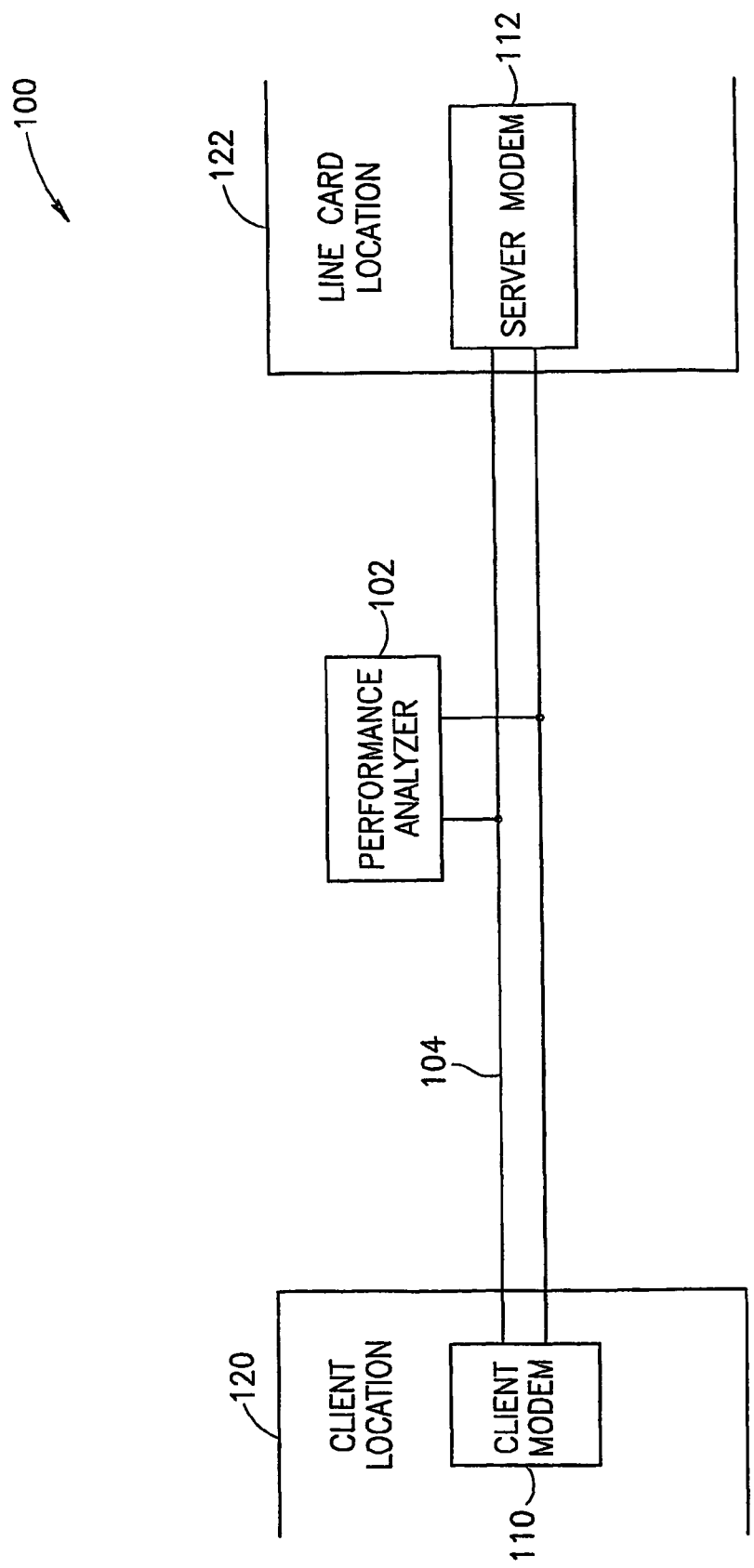
FIG. 1 is a schematic illustration of a performance analyzer connected to an ADSL connection, in accordance with an exemplary embodiment of the invention.

FIG. 1 is a schematic illustration of a performance analyzer 102 connected to an ADSL connection 100, in accordance with an exemplary embodiment of the invention. ADSL connection 100 is typically established over a twin pair line 104, which generally connects a client location 120 to a line-card 122 of a public telephone network. A client modem 110 connects to twin pair line 104 at a first end, in client location 120, and a server modem 112 (referred to also as a DSLAM), connects to twin pair line 104 at a second end, in the location of line-card 122. In some embodiments of the invention, ADSL connection 100 operates according to a protocol which uses different frequency bands for upstream and downstream transmission. Alternatively, as described below with reference to FIG. 5B, ADSL connection 100 may operate according to a protocol including overlapping frequency bands, and time separation, for upstream and downstream signals.

Figure 2:
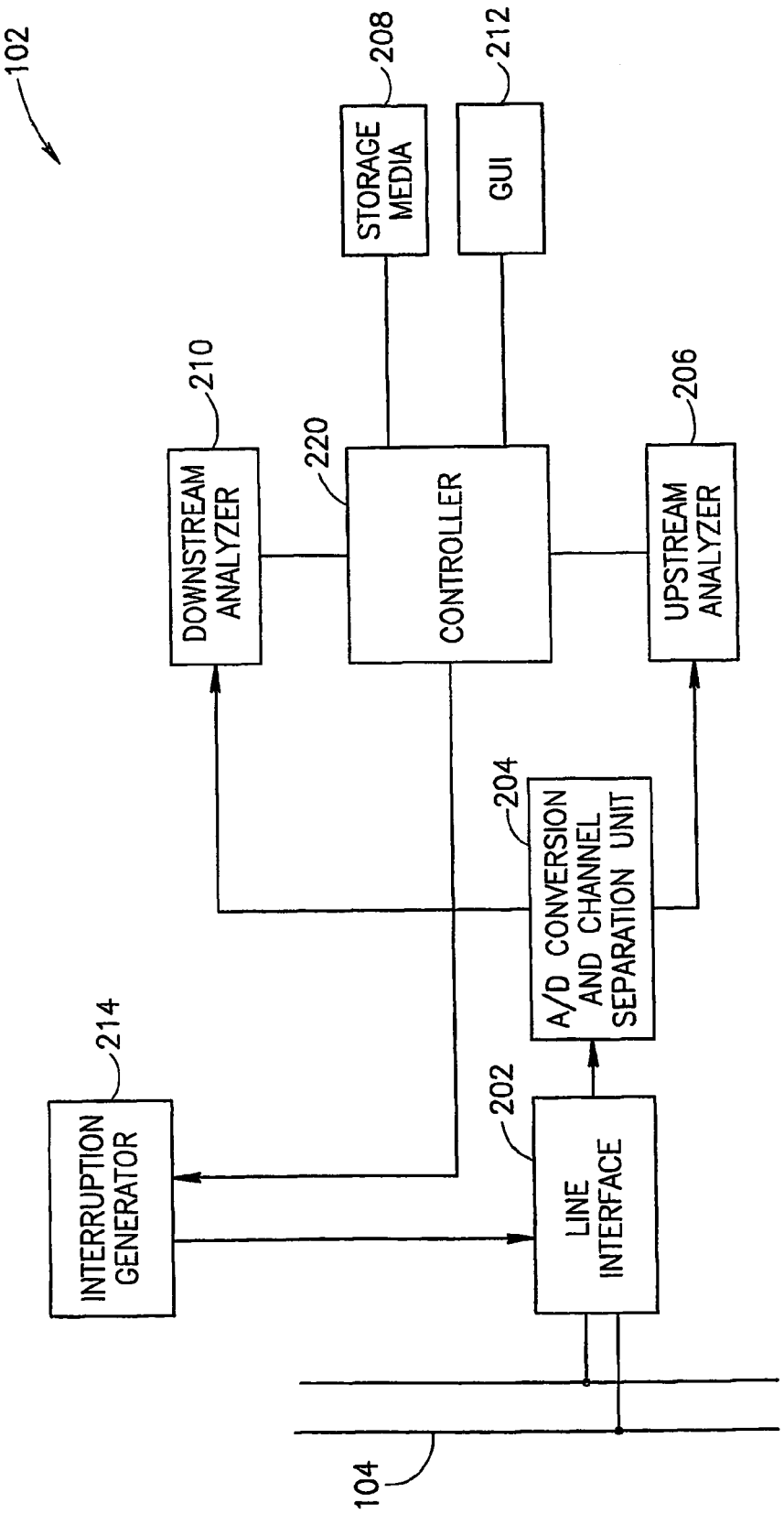
FIG. 2 is a schematic block diagram of a performance analyzer, in accordance with an exemplary embodiment of the invention.

FIG. 2 is a schematic block diagram of performance analyzer 102, in accordance with an exemplary embodiment of the invention. Performance analyzer 102 optionally includes a line interface 202 which connects to twin pair line 104 and senses the signals thereon. Line interface 202 optionally includes a high-impedance low-noise interface suitable for sensing signals from line 104 without interfering with the signals transmitted on the line. The sensed signals from line interface 202 are optionally provided to an A/D converter and channel separation unit 204, which separates the sensed signals into upstream and downstream signals and converts the sensed analog signals into digital samples. The upstream and downstream digital samples are provided, respectively, to an upstream analyzer 206 and a downstream analyzer 210, which analyze the data of their respective channel, as described in detail below. A controller 220 optionally receives information from both upstream analyzer 206 and downstream analyzer 210 and generates combined analyzed data. Examples of the combined analyzed data are described below. In some embodiments of the invention, controller 220 additionally controls the operation of upstream analyzer 206, downstream analyzer 210 and/or A/D converter and channel separation unit 204.

Optionally, the samples and/or analysis results are stored on a storage media 208, for further reference and/or for comparison to later received signals. A graphic user interface (GUI) 212 optionally displays the raw digital samples and/or the analyzed data. Optionally, a user may select which data is to be stored and/or displayed. Alternatively or additionally, the user may control other functions of performance analyzer 102, such as when alerts are provided and/or when retrains are to be initiated. Optionally, performance analyzer 102 may be configured to monitor only some of the signals passing on the connection. In an exemplary embodiment of the invention, performance analyzer 102 may be configured only to monitor retrains, only to monitor show-time transmission, or to perform continuous monitoring. In some embodiments of the invention, the raw signals and/or analyzed data are transmitted to a remote unit for further analysis and/or for display.

In some embodiments of the invention, an interruption generator 214 is adapted to provide a noise signal on line 104, so as to induce a retrain of the modem connection. Optionally, interruption generator 214 provides a noise which does not affect low frequencies of the channel, which are dedicated for carrying regular telephone connections. Optionally, interruption generator 214 provides a noise on one or more specific frequencies, which noise disrupts the entire ADSL connection. In some embodiments of the invention, interruption generator 214 provides a noise-on the pilot tone frequency of DSL connections, e.g., 276 kHz.

Alternatively or additionally, noise is provided in a plurality of frequencies so that a retrain is forced regardless of the type of DSL connection used and/or the exact frequencies currently used for data transmission. For example, the provided noise may include a wide band noise with a relatively high amplitude.

Alternatively or additionally, interruption generator 214 shorts line 104 for high frequencies, by connecting a low impedance connection for high frequencies, to line 104. The use of a low impedance short in order to initiate a retrain makes it harder to identify the source of the retrain. In addition, the short does not include actively generated noise which may interfere with neighboring lines to which the short is not directly connected.

Figure 3:
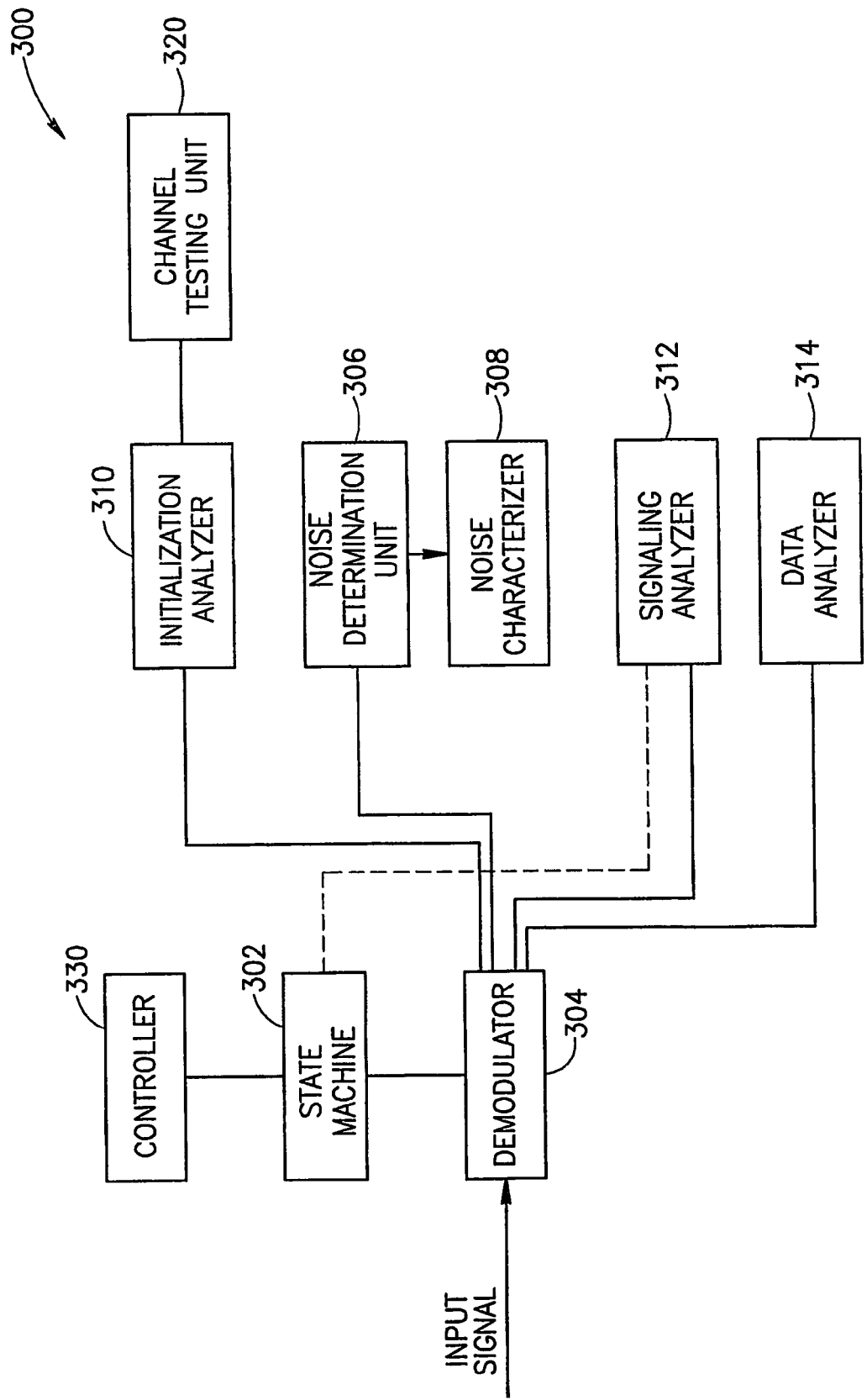
FIG. 3 is a schematic block diagram illustrating the operation of a channel analyzer, in accordance with an exemplary embodiment of the invention.

FIG. 3 is a schematic block diagram illustrating the operation of an analyzer 300, which may be used in implementing upstream analyzer 206 and/or downstream analyzer 210, in accordance with an exemplary embodiment of the invention. A state machine 302 optionally keeps track of the state of the modem connection, for example whether the connection is carrying data or initialization and activation signals. State machine 302 optionally further keeps track of the frequency bands used for transferring data, the bit rates used in each frequency band and/or the signal mappings used. State machine 302 optionally receives data from other units of analyzer 300 (for simplicity connections are not shown) and accordingly keeps track of the state of the connection. A demodulator 304 optionally receives the signals of the connection from channel separation unit 204 and converts them into bits, according to the current state of the modem connection as tracked by state machine 302. In some embodiments of the invention, a noise determination unit 306 determines the noise spectrum on the connection, based on a comparison of a theoretical re-modulation of the converted bits to the actually received signals. Optionally, a noise characterizer 308 attempts to determine the type of the noise according to the noise spectrum, for example by comparing the determined noise spectrum to predetermined known spectrums.

During initialization and activation, an initialization analyzer 310 optionally receives the demodulated bits and forms therefrom a map of the initialization process. Accordingly, state machine 302 is optionally updated.

In some embodiments of the invention, when known training signals are transmitted from one of the modems, to allow the other modem to evaluate the line, a channel testing unit 320 analyzes the training signals to determine the channel quality, in a manner similar to that performed by the end modems of the connection. The results of the channel testing are optionally compared to the results transmitted by the end modem (110 or 112 in FIG. 1) receiving the testing signals. According to the comparison, testing-signal analyzer 310 optionally determines the relative positioning of performance analyzer 102 on twin pair line 104, and/or evaluates the operation of the end modem.

During data transfer (also referred to as show time), a signaling analyzer 312 optionally receives the demodulated bits and extracts from them signaling bits which are transmitted along with the data. Signaling analyzer 312 optionally generates a map of the signaling signals and accordingly updates state machine 302, when appropriate. Alternatively or additionally, signaling analyzer 312 directly updates demodulator 304 on changes which relate to the demodulation, when necessary. In this alternative, state machine 302 may be omitted from analyzer 300 or may be included in demodulator 304 or controller 330. For example, the signaling bits may indicate a change in the utilization of the channel frequencies, and this data is required for the demodulation.

The signaling bits transferred during the show time stage (e.g., AOC, EOC and/or indicator bits) from analyzer 312 are optionally provided to controller 220 for display to the user and/or for verifying correct performance of the end modems. In some embodiments of the invention, when the signaling bits indicate a change in the transmission, such as a bit swap, controller 220 suggests possible causes of the change.

In some embodiments of the invention, a data analyzer 314 determines the data content of the received data bits, performing one or more higher layer tasks. Alternatively, the data content is not determined, so that performance analyzer 102 can be used without affecting the privacy of the users of the modem.

A controller 330 optionally controls the transfer of signals from demodulator 304 to the other elements of analyzer 300, for example according to the state of state machine 302.

Referring in more detail to demodulator 304, in some embodiments of the invention, the demodulation includes a trellis operation, during data transfer. Optionally, demodulator 304 keeps track of the operation of the trellis decoding and provides indications on the trellis decoding to controller 220 for display to the user. For example, in some cases when iterative decoding is used, demodulator 304 may track the number of trellis rounds required for correct demodulation and/or the number of samples having values corrected during traversing the trellis. In some embodiments of the invention, demodulator 304 performs trellis decoding using different methods and reports which decoding methods were sufficient to demodulate the signals correctly and which methods were not able to achieve a correct result. In other embodiments of the invention, no information is provided to the user from the trellis decoding. Optionally, when the protocol requires a trellis decoding or allows a trellis decoding, performance analyzer 102 includes a processor suitable for performing the trellis decoding efficiently and quickly.

Alternatively or additionally, demodulator 304 keeps track of other demodulation parameters, such as filter coefficients, mapper points and/or Reed Solomon performance. In some embodiments of the invention, demodulator 304 is adapted to identify retrain signals and accordingly to update state machine 302. In some embodiments of the invention, demodulator 304 also provides data on the power spectrum density of the signals.

Referring in more detail to noise determination unit 306, in some embodiments of the invention, noise determination unit 306 accumulates noise values for data blocks of a predetermined size and for each data block determines noise statistics, for example noise levels for each frequency band. Optionally, noise determination unit 306 is adapted to identify unusual noise levels and/or events and characterize the noises, for example as impulse noises, cross-talk noises or attenuations. Noise characterizer 308 optionally compares the determined noise statistics to predetermined noise spectrums of known events. In an exemplary embodiment of the invention, noise characterizer 308 stores noise spectrums of interference events, such as from wireless sources, adjacent wire communication lines, radio sets and electric appliances. Alternatively or additionally, noise characterizer 308 is pre-configured with expected affects of temperature changes on the noise level and/or attenuation causes. In some embodiments of the invention, noise characterizer 308 is configured with expected spectrums of purposely added noise, for example noise added by a line tapping unit. Optionally, controller 220 provides a warning on possible tapping units on line 104.

In some embodiments of the invention, when a possible tapping is identified, performance analyzer 102 provides indications on the probable location of the tapping unit, for example based on the timing and/or amplitude of the tapping noise. Alternatively or additionally, when performance analyzer 102 identifies a first sign of a possible tapping unit, the performance analyzer keeps track of additional signs in the received signals which indicate presence of the tapping unit.

In some embodiments of the invention, performance analyzer 102 actively transmits test signals on the line to identify whether a tapping unit is connected to line 104. Alternatively or additionally, performance analyzer 102 may be configured to prevent any transmissions on lines 104 when a tapping is identified, in order to prevent leakage of secret information.

Optionally, for each block having an irregular noise pattern, noise characterizer 308 provides controller 220 with one or more possible reasons for the irregularity in the noise.

Noise determination unit 306 is optionally adapted to determine the attenuation level caused by lines 104, for example by comparing the level of the received signals to the known transmitted level. Alternatively or additionally, noise determination unit 306 determines the signal to noise ratio of the signals.

In some embodiments of the invention, controller 220 provides warnings on incorrect behavior of the end modems. Optionally, controller 220 follows transmission threads of the modems and provides a warning when one of the modems performs differently than required by the governing protocol. For example, when a modem is requested to change the frequency bands it uses for data transmission, controller 220 verifies that the modem moved at the correct time to the new band division. In another example, controller 220 follows the negotiation signals transmitted between the modems and provides a warning when the signals are different than prescribed by the governing protocol.

Optionally, controller 220 also searches for lower layer causes of problematic higher layer effects. For example, when a retransmission of data is requested, controller 220 optionally searches to see if, at the time the original data was transmitted, there was an interference on the line, such as an unusual noise level, a low signal to noise ratio (SNR), a high attenuation level and/or if the modem suffered from skew or other problematic effects in some embodiments of the invention, suggested causes are provided for other identified higher layer problems, such as CRC errors, corrupted bits, and/or low performance of Reed Solomon decoding. In some embodiments of the invention, when one of the modems requests a change in the bit allocation of the frequency band, controller 220 determines the cause of the request and whether the request was necessary.

Alternatively or additionally, controller 220 indicates higher layer effects caused by lower layer problems, such as impulse noises and/or cross-talk noises (e.g., from other ADSL lines, from wireless transmissions and/or from regular telephone use). In some embodiments of the invention, controller 220 provides statistics on the stability of the connection. For example, controller 220 may provide indication of the percentage of cases in which an impulse noise causes higher layer trouble and/or the average rate at which higher layer problematic events occur.

In some embodiments of the invention, controller 220 is adapted to compare signal exchanges of one connection with signal exchanges of previous connections. For example, a test session may include connecting a plurality of different modems to a tested modem and comparing the training sessions of the different connections.

Optionally, a user may request controller 220 to display data from previous connections, optionally showing an entire connection.

Figure 4A:
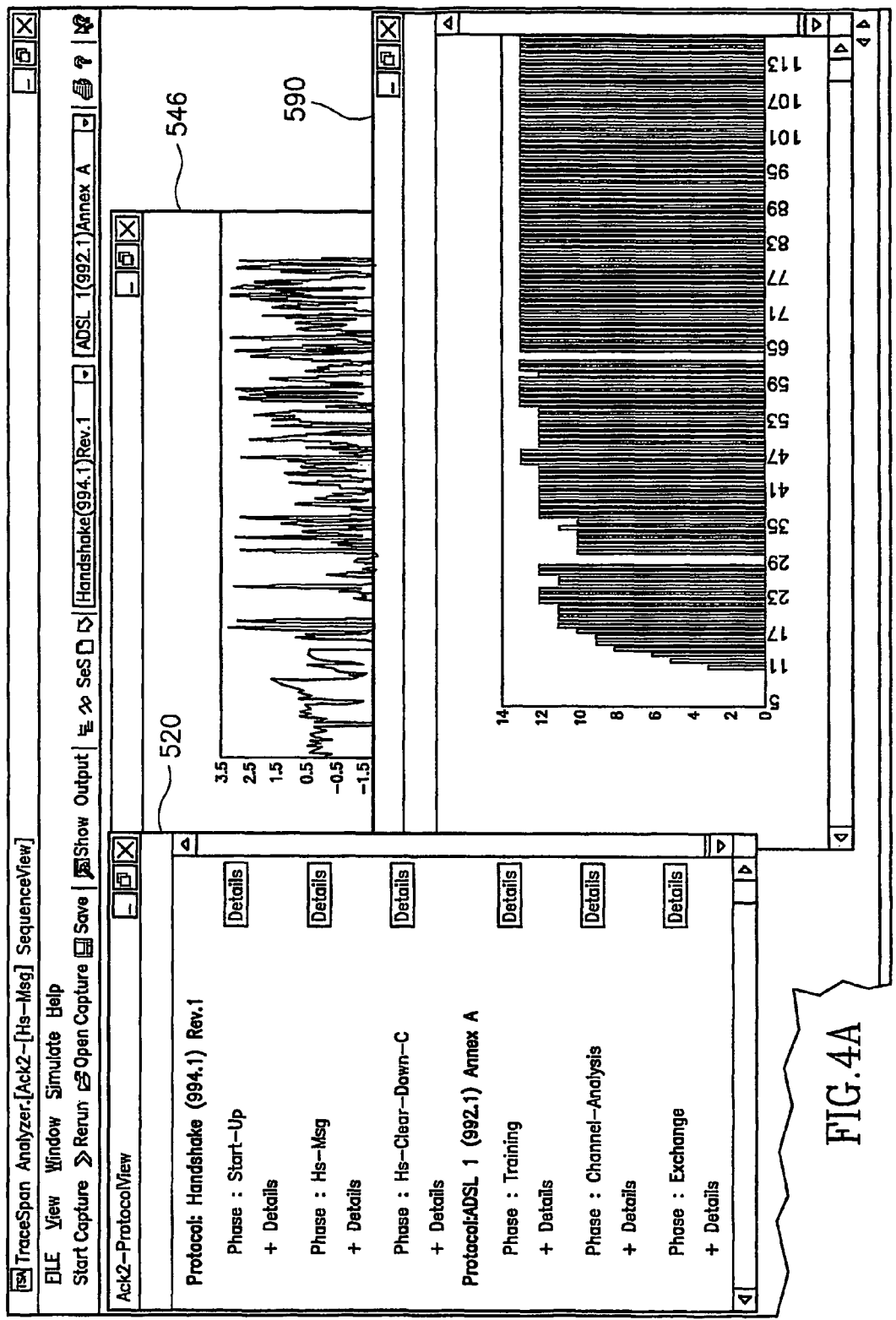
FIGS. 4A-4D are schematic screen views provided by a graphic user interface, in accordance with an exemplary embodiment of the invention.
Figure 4B:
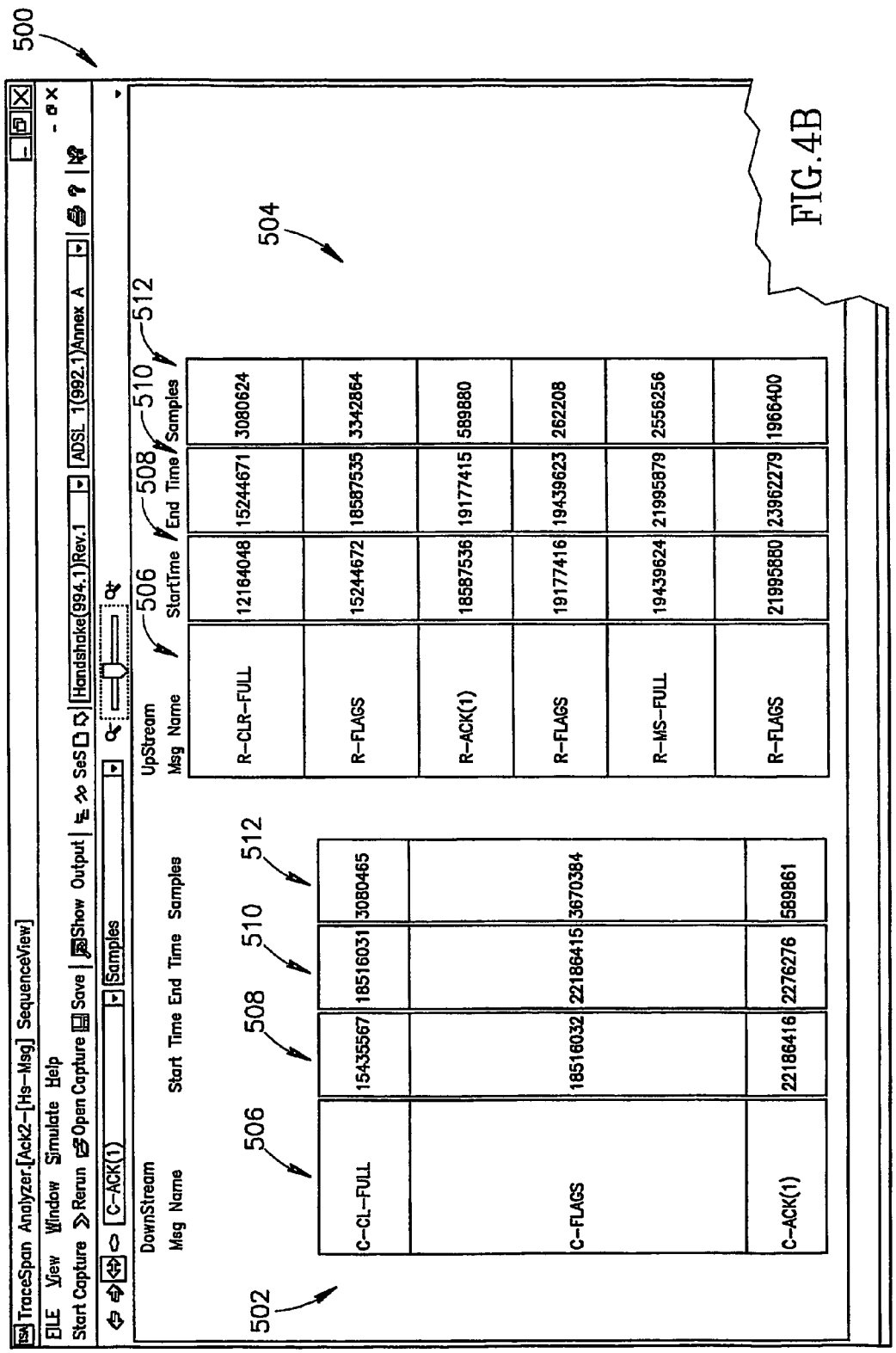
Figure 4C:
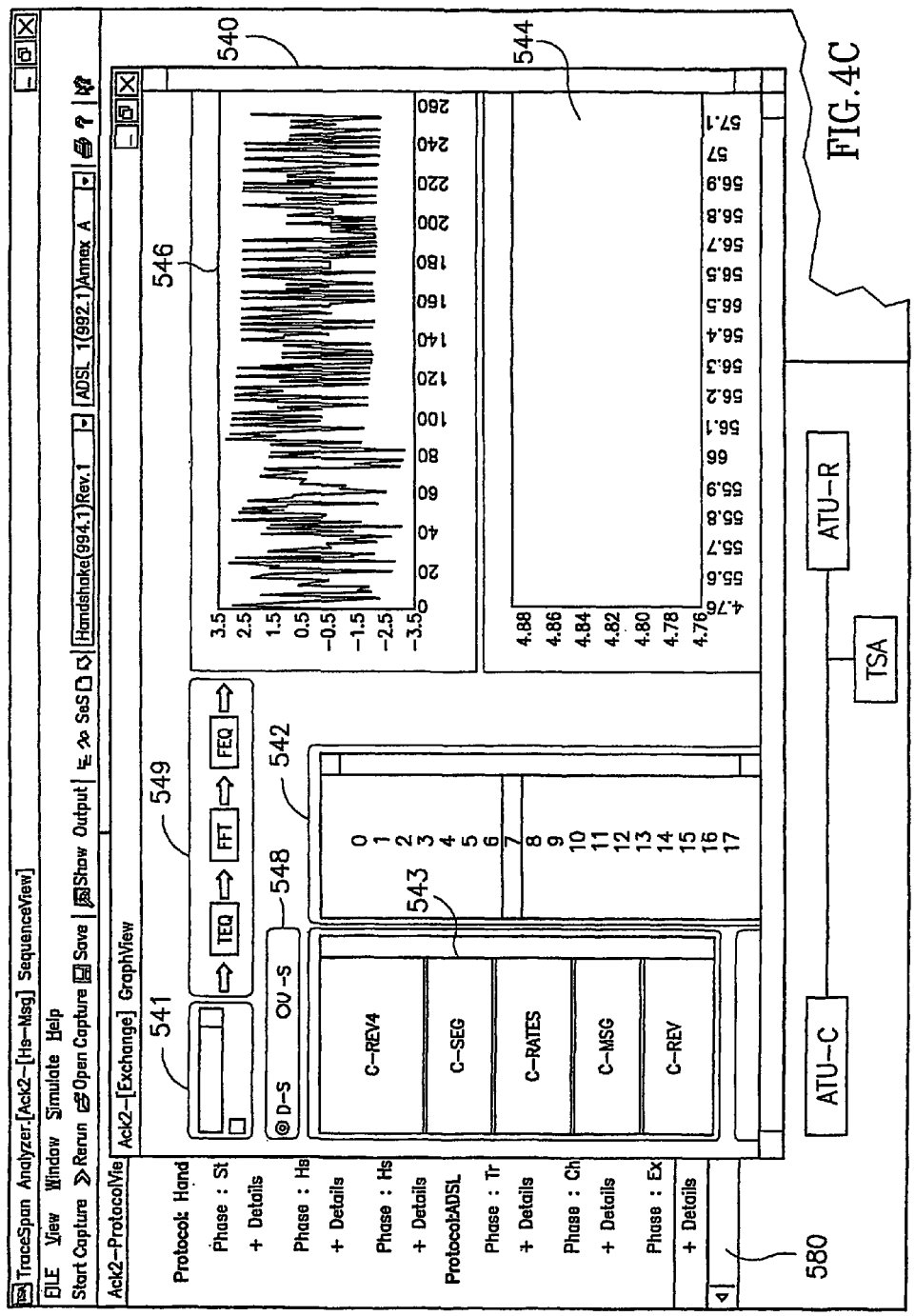
Figure 4D:
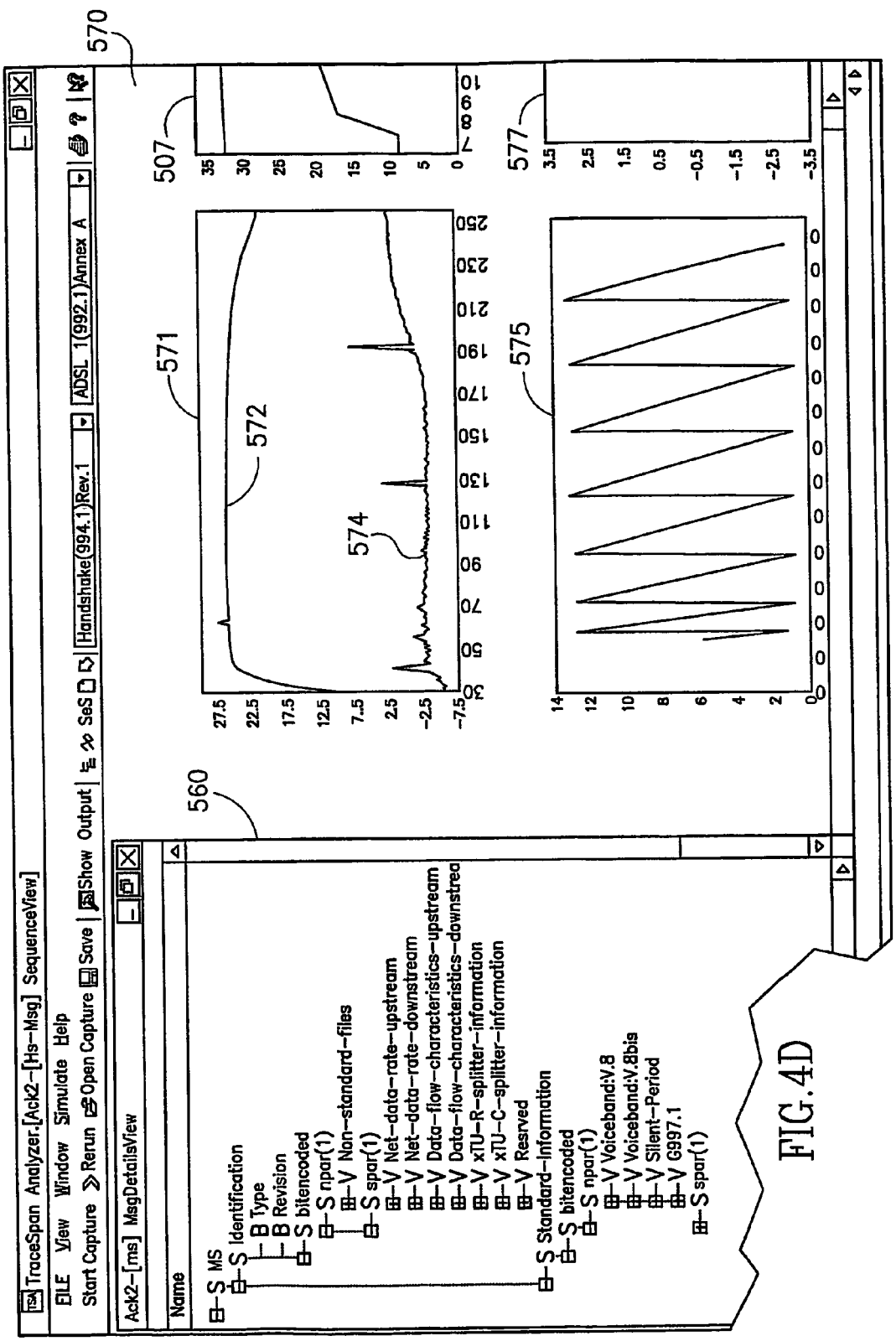

FIGS. 4A-4D are schematic screen views provided by GUI 212, in accordance with an exemplary embodiment of the invention. In FIG. 4A, a screen 520 shows a general high level overview of a monitored connection. Screen 520 lists the stages (phases) of the connection and optionally the protocols governing each of the stages. For each operation stage (phase) of the connection, a user may optionally request additional details. For example, responsive to a request for additional details about a negotiation phase, a screen 500 (FIG. 4B) which shows a portion of an ADSL initialization stage, is optionally shown. Screen 500 optionally includes a downstream portion 502 and an upstream portion 504. The name 506 of each signal transmitted on the connection is optionally displayed with its beginning 508 and ending 510 transmission times and/or the number 512 of samples it includes. Optionally, the signals of the upstream and downstream are displayed with time correlation, such that a viewer can easily determine the signal time line of the connection. In some embodiments of the invention, a user may click on any of the signal names to view more details about the signal.

A screen 540 (FIG. 4C) optionally displays the spectrum, magnitude 544 and phase 546 of the transmitted signals. Optionally, a user may select whether to view upstream and/or downstream signals 548, the type of view (e.g., spectrum) 541 and/or the processing stage 549 at which the spectrum signals are viewed. In some embodiments of the invention, the user may select whether to view the spectrum before they undergo time domain equalization (TEQ), fast Fourier transformation (FFT), frequency domain equalization (FEQ) or after the FEQ. Optionally, the user may select the time duration for which the spectrum may be viewed. The user may select one or more signals for which the spectrum is to be displayed from bar 543 and/or may select one or more time blocks from bar 542.

In some embodiments of the invention, a screen 560 (FIG. 4D) lists the fields of each signal and the bit content of each field with an explanation of the value of each field. Optionally, a screen 570 shows the properties of line 104. Optionally, an upstream graph 571 and a downstream graph 507 (shown only partially) show the transfer function 572 and the noise form 574 of the communication line. Graphs 575 and 577 optionally show the respective phases.

In some embodiments of the invention, a screen 580 shows the position of performance analyzer 102 along line 104. The position is optionally estimated based on the signals received by performance analyzer 102.

Figure 5A:
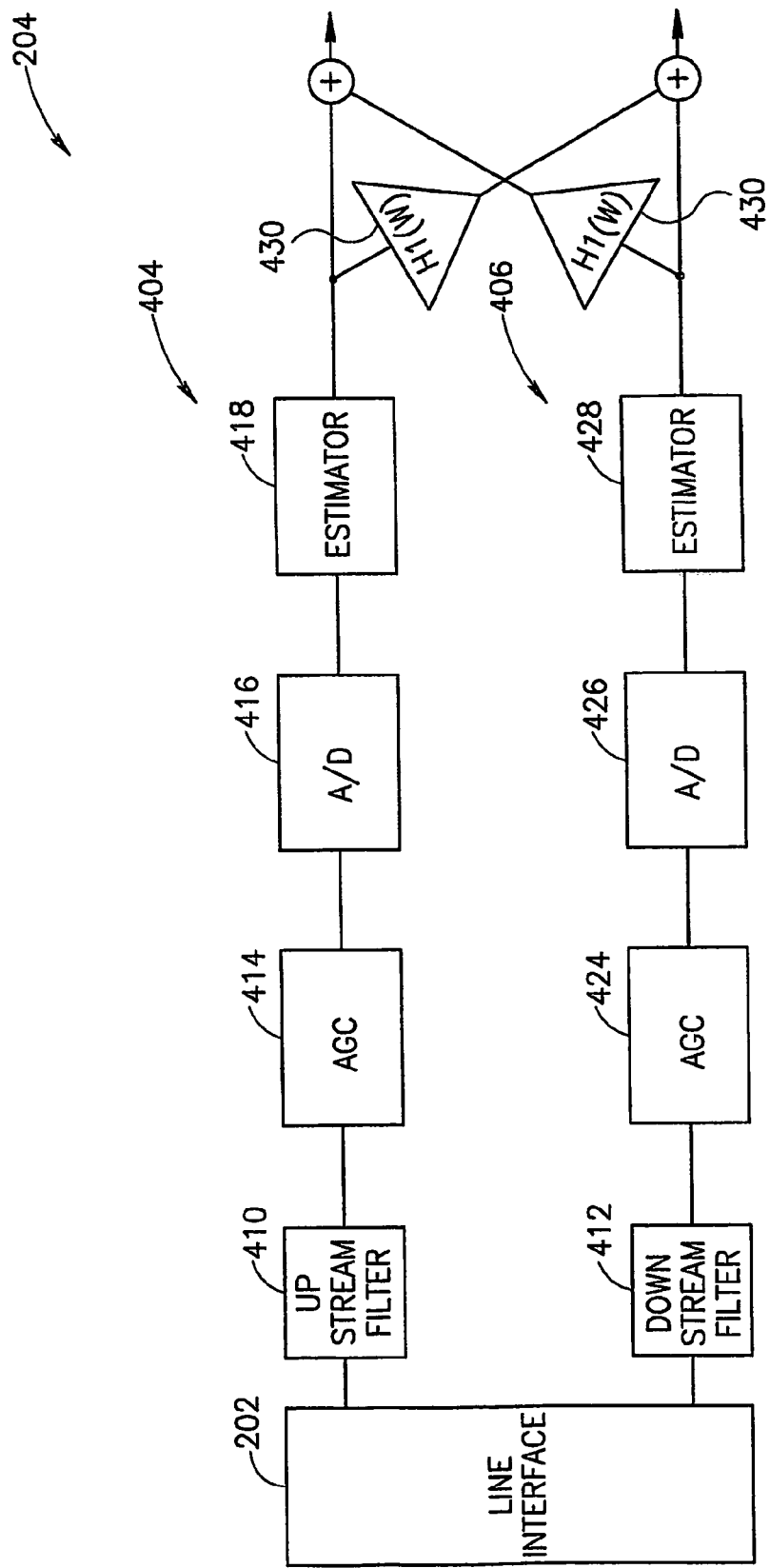
FIGS. 5A and 5B are schematic block diagrams of channel separators, in accordance with exemplary embodiments of the invention.

FIG. 5A is a schematic block diagram of A/D converter and channel separation unit 204, in accordance with an exemplary embodiment of the invention. Unit 204 optionally includes an upstream processing path 404 and a down stream processing path 406. At the entrance to upstream path 404, an up stream filter 410 filters the sensed signals allowing only signals belonging to the upstream band to pass (in exemplary protocols known in the art, signals between 27-138 kHz). Optionally, upstream filter 410 allows additional signals at marginal frequencies to pass through the filter so as not to loose any data. The upstream signals are passed through an automatic gain controller (AGC) 414 and an analog to digital converter (A/D) 416, which converts the signals into digital samples. The digital samples are optionally passed to an estimator 418 which removes affects of the downstream on the upstream signals, using methods known in the art.

In parallel, the sensed signals are optionally passed to a downstream filter 412 which passes only signals that belong to the downstream channel, optionally with additional margins. The downstream signals are transferred through an AGC 424 and an A/D 426, which converts the downstream signals into digital samples. The digital samples of the downstream are passed to an estimator 428 which removes affects of the upstream on the downstream signals, using methods known in the art.

In some embodiments of the invention, if necessary according to the protocol governing the transmission of signals on lines 104, the bands of filters 410 and 412 are adjustable according to the current transmission conditions on the lines.

Optionally, for additional accuracy, estimators 430 are also included in unit 204 to remove residue cross-talk between the upstream and downstream channels, as is known in the art. The cleaned upstream and downstream signals are optionally passed to their respective signal analysis units 206 and 210 (FIG. 2).

Figure 5B:
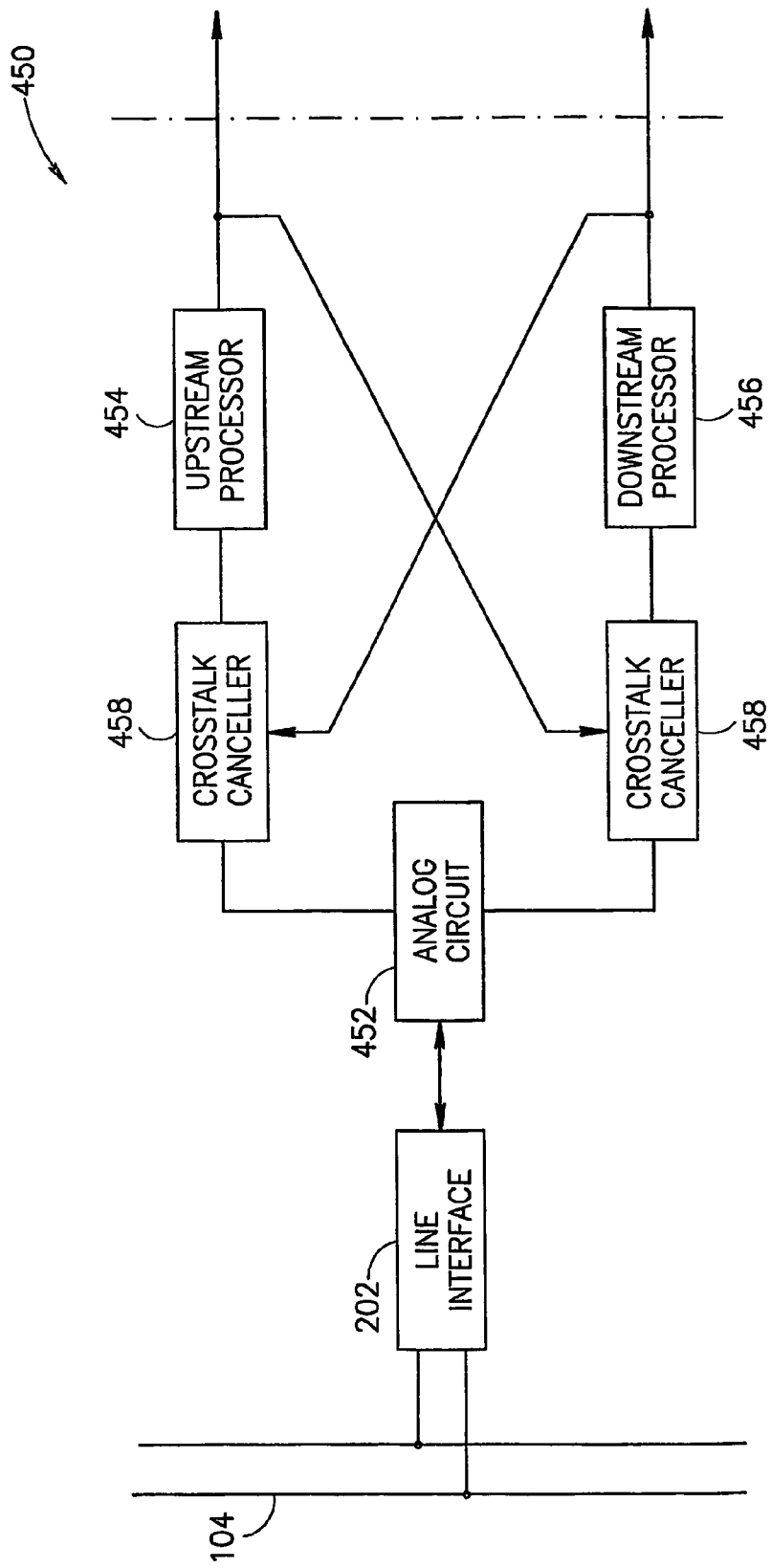

FIG. 5B is a schematic block diagram of an overlap cancellation unit 450 to be used instead of A/D converter and channel separation unit 204, in accordance with an exemplary embodiment of the invention. Overlap cancellation unit 450 is optionally used when ADSL connection 100 carries signals according to a protocol including overlapping frequency bands for upstream and downstream signals. Overlap cancellation unit 450 optionally includes an analog circuit 452, which converts the signals from line interface 202 into digital samples. The digital samples are optionally provided to separate upstream and downstream processors 454 and 456 which estimate the signals of their respective channel, for example according to the different amplitudes of the channels. The estimations from the processors 454 and 456 and optionally provided to cross-talk cancellers 458 which reduce the estimations of the opposite channel from the signals provided to the processors.

In some embodiments of the invention, the estimation performed by processors 454 and 456 are repeated several times, to achieve a good channel separation. Optionally, the estimation is repeated until an error rate below a predetermined value is achieved and/or until an achieved correction between two consecutive iterations is smaller than a predetermined level. Alternatively or additionally, a predetermined number of iterations is performed.

Alternatively or additionally, to differentiating between the signals in the upstream and downstream according to their amplitude, the signals are separated according to the timings of the signals. Optionally, overlap cancellation unit 450 keeps track of and/or receives data from other units of performance analyzer 102 and accordingly the upstream and downstream signals are separated. For example, when some of the frequency bands do not overlap, the signals in overlapping frequencies are separated according to which of the upstream or downstream bands have signals at the same time. Alternatively or additionally, the signals are separated according to the stream to which the signals immediately preceding or following in time, belong.

In some embodiments of the invention, controller 220 operates independently from unit 204 or 450. Alternatively, one or more parameters determined by unit 204 or 450, such as the AGC gain level is provided to controller 220 and is used in evaluating the connection and/or is displayed by GUI 212.

Performance analyzer 102 is optionally positioned close to client modem 110 or close to server modem 112. Positioning performance analyzer 102 close to one of the modems may allow simpler separation of the upstream and downstream signals. Alternatively, performance analyzer 102 is positioned at a middle point between the modems so that neither of the upstream and downstream signals in maximally attenuated. It is noted that since, in some embodiments of the invention, performance analyzer 102 is passive and, for example, does not request retransmissions, avoidance of high attenuation is required to a greater extent than for the end modems.

Although the above description relates to an ADSL connection, the invention is not limited to any specific modem connection, and may be used with other DSL connections as well as other modem connections, such as VBM connections.

In some embodiments of the invention, performance analyzer 102 is used in testing modems for standard compliance and/or in testing a pair of modems for interoperability assurance. Alternatively or additionally, performance analyzer 102 is used in modem testing and/or debugging. Further alternatively or additionally, performance analyzer 102 is used in troubleshooting, quality of service (QoS) monitoring, modem qualification and/or rating, communication system maintenance and/or for general performance analysis.

The elements of performance analyzer may be implemented using dedicated hardware or may be implemented by a combination of software and hardware. For example, analyzer 300 may be implemented in software on a single general purpose computer or on a plurality of dedicated or general purpose processors. Each element of analyzer 300 may be implemented by a separate software module or some or all of the elements of analyzer 300 may be implemented by a single software module. Alternatively or additionally, different task divisions than those described above may be used.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods, and methods of using the apparatus. The screen shots shown in FIGS. 4A-4D were presented by way of example and many other views may be used in accordance with the present invention. The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A method of monitoring a modem connection, comprising:
connecting a line interface for listening to a communication link carrying signals of a modem connection, at a location on the communication link between a pair of end modems separate from the line interface;
passively collecting signals passing on the communication link, between the end modems, through the line interface;
determining one or more physical quality or transmission characteristics regarding the modem connection, responsive to the collected signals; and
providing information on the modem connection, responsive to the collected signals;
further comprising forcing a retrain of the modem connection by a same apparatus as collects the signals passing on the communication link, and
further comprising forcing the retrain of the modem connection comprises connecting a low impedance circuit, for at least some of the frequency bands carrying signals, to the communication link.

2. A method according to claim 1, comprising determining quality or transmission characteristics regarding the modem connection, responsive to signals collected through the line interface, and wherein providing information on the modem connection comprises providing information on the determined characteristics.

3. A method according to claim 2, wherein providing information on the modem connection comprises providing information on noise levels on the connection.

4. A method according to claim 3, wherein providing information on the modem connection comprises providing information on efficiency or data integrity effects in upper layers caused by the noise levels on the connection.

5. A method according to claim 1, wherein the modem connection comprises an xDSL modem connection.

6. A method according to claim 1, wherein collecting signals passing on the communication link comprises collecting without sending to either of the modems acknowledgment signals or any other modem tangible signals.

7. A method according to claim 1, wherein providing information on the modem connection comprises displaying the contents of one or more modem negotiation signals.

8. A method according to claim 1, wherein providing information on the modem connection comprises providing information on the symbol mapping used by the connection.

9. A method according to claim 1, wherein providing information on the modem connection comprises displaying information on signaling signals transmitted in parallel to data transmission.

10. A method according to claim 1, and further comprising performing signal tests on test signals transmitted on the connection and comparing the results of the tests to negotiation signals reporting test results from one of the modems.

11. A method according to claim 1, wherein the modem connection comprises a DSL connection and wherein the forcing of the retrain does not interfere with voice frequency bands of the communication link.

12. A method according to claim 1, wherein the modem connection comprises a voice band modem connection.

13. A method according to claim 1, comprising identifying changes in the operation of the modem connection and providing suggested causes of the changes.

14. A method according to claim 13, where the causes are at least a retrain or a bit swap.

15. A method according to claim 13 and wherein at least one of the changes identified belongs to a group comprising:
a request for retransmission of data;
CRC errors;
corrupted bits;
low performance of Reed Solomon decoding; and
a request for a change in bit allocation of a frequency band.

16. A method according to claim 13 and wherein at least one of the suggested causes belongs to a group comprising:
an unusual noise level;
a low Signal to Noise Ratio;
a high attenuation level; and
a modem suffering from skew.

17. A method according to claim 1, wherein providing information on the modem connection comprises displaying a raw bit content of signals transmitted on the modem connection.

18. A method according to claim 1, wherein providing information on the modem connection comprises providing a warning on a possible tapping of the communication link.

19. A method according to claim 18 and wherein the warning on a possible tapping of the communication link is based, at least in part, on comparing measured spectrums of noise to configured expected spectrums of noise added by a line tapping unit.

20. A method according to claim 1, comprising extracting the data transmitted on the modem connection.

21. A modem connection performance analyzer, comprising:
- a line interface adapted:
  - to connect to a communication link and to passively collect signals of a modem connection passing on a communication link, at a location on the communication link between two end modems connected to the link without injecting modem tangible signals;
  - to force a retrain of the modem connection by a same apparatus as collects the signals passing on the communication link; and
  - to force the retrain of the modem connection by connecting a low impedance circuit, for at least some of the frequency bands carrying signals, to the communication link;
- a processor adapted to determine one or more physical quality or transmission characteristics regarding the modem connection, responsive to the collected signals; and
- an interface operable by a human adapted to provide information on the determined characteristics.

22. A performance analyzer according to claim 21, comprising
- a low impedance shorting circuit adapted to short at least some of the frequencies of the communication link, responsive to a command from the processor.

* * * * *